United States Patent [19]

Adamson

[11] 4,083,181
[45] Apr. 11, 1978

[54] GAS TURBINE ENGINE WITH RECIRCULATING BLEED

[75] Inventor: Arthur P. Adamson, Cincinnati, Ohio

[73] Assignee: The United States of America as represented by the Administrator of the National Aeronautics and Space Administration, Washington, D.C.

[21] Appl. No.: 695,513

[22] Filed: Jun. 14, 1976

[51] Int. Cl.² .................................................. F02C 3/00
[52] U.S. Cl. .................................. 60/39.52; 60/226 R
[58] Field of Search ............... 60/39.52, 39.53, 226 R, 60/39.09 D

[56] References Cited

U.S. PATENT DOCUMENTS

| 2,404,275 | 7/1946 | Clark et al. | 60/39.52 |
| 2,599,470 | 6/1952 | Meyer | 60/39.52 |
| 2,863,282 | 12/1958 | Torell | 60/39.53 |
| 2,906,092 | 9/1959 | Haltenberger | 60/39.52 |
| 3,123,283 | 3/1964 | Leis | 60/39.09 D |
| 3,754,393 | 8/1973 | Handa | 60/39.52 |
| 3,785,145 | 1/1974 | Amann | 60/39.52 |
| 3,792,581 | 2/1974 | Handa | 60/39.52 |
| 3,830,058 | 8/1974 | Ainsworth | 60/226 R |
| 3,908,362 | 9/1975 | Szydlowski | 60/39.53 |
| 3,927,958 | 2/1975 | Quinn | 60/39.52 |

FOREIGN PATENT DOCUMENTS

| 527,041 | 6/1956 | Canada | 60/39.09 D |
| 446,244 | 3/1949 | Italy | 60/39.52 |
| 158,752 | 11/1962 | U.S.S.R. | 60/39.52 |

*Primary Examiner*—Robert E. Garrett
*Attorney, Agent, or Firm*—Derek P. Lawrence; Robert C. Lampe, Jr.; John R. Manning

[57] ABSTRACT

A method of reducing carbon monoxide and unburned hydrocarbon emissions in a gas turbine engine by bleeding hot air from the engine cycle and introducing it back into the engine upstream of the bleed location and upstream of the combustor inlet. As this hot inlet air is recycled, the combustor inlet temperature rises rapidly at a constant engine thrust level. In most combustors, this will reduce carbon monoxide and unburned hydrocarbon emissions significantly. The preferred locations for hot air extraction are at the compressor discharge or from within the turbine, whereas the preferred re-entry location is at the compressor inlet.

3 Claims, 4 Drawing Figures

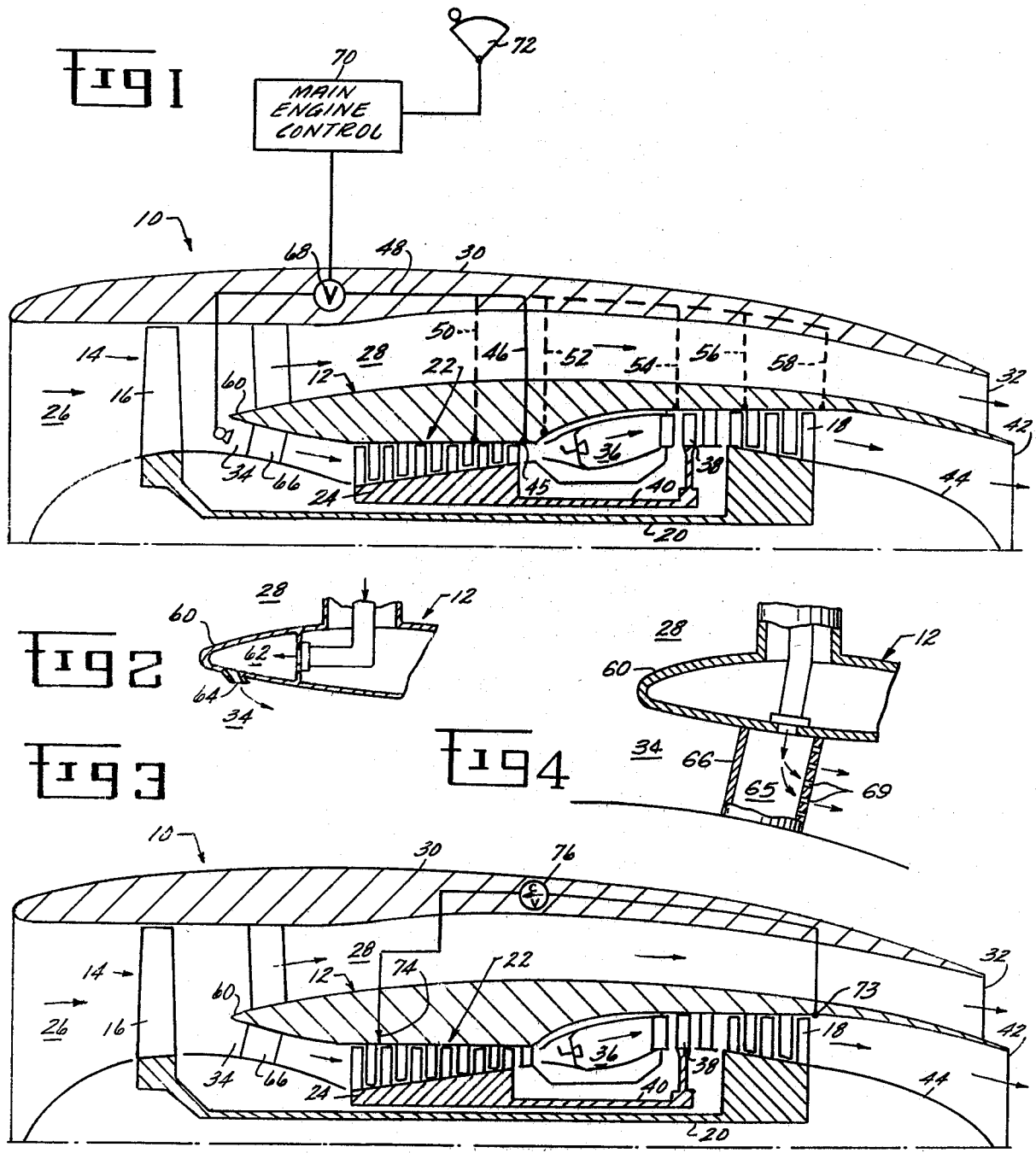

GAS TURBINE ENGINE WITH RECIRCULATING BLEED

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention pertains to gas turbine engines and, more particularly, to a method of operating same to reduce carbon monoxide and unburned hydrocarbon emissions.

The present era of environmental awareness has spurred governmental regulations limiting the permissible exhaust emissions from gas turbine engines. Some of the more severe requirements relate to carbon monoxide (CO) and unburned hydrocarbon (HC) emissions. These emissions have traditionally been the greatest at ground idle conditions where the combustor inlet temperature and pressure, and the combustor fuel-to-air ratio, are relatively low.

As gas turbine powered aircraft are designed for operation from shorter runways, the emissions problem will become more acute. The reason is that short-field aircraft must be overpowered (i.e., higher installed thrust-to-aircraft weight ratio) compared to the more conventional take-off and landing aircraft. For example, during taxi operation the engine power setting must be reduced abnormally to avoid overloading the aircraft brakes, particularly on icy runways. As the engine throttle is pulled back to this abnormal position, the combustor inlet temperature drops (due to lower work input of the compressor) resulting in inefficient burning and increased exhaust emission levels. A similar condition exists during the landing cycle if the aircraft maintains a holding pattern, since there again the power level must be abnormally low (on a percentage thrust basis) due to the high installed thrust level.

The problem is further compounded, however, since not only does the low combustor inlet temperature result in increased exhaust emissions, but it also degrades the aircraft anti-icing system effectiveness. Some aircraft and engine surfaces are normally heated by air bled from the combustor inlet and if this air is too cool the heating process does not function properly.

SUMMARY OF THE INVENTION

Accordingly, it is the primary object of the present invention to provide a method of operating a gas turbine engine in order to reduce CO and HC emissions at low power settings.

It is a further object of the present invention to provide an improved gas turbine engine having reduced CO and HC emissions at low power settings.

These and other objects and advantages will be more clearly understood from the following detailed description, drawings and specific examples, all of which are intended to be typical of rather than in any way limitng to the scope of the present invention.

Briefly stated, the above objects are accomplished in a gas turbine engine wherein hot air is bled from the engine at a first location and reintroduced back into the engine at a second location, with the necessary constraints that the temperature of the air at the first location exceeds that of the second and wherein the re-entry location is at least as far upstream as the combustor inlet. Thus, as the hot air is recycled the combustor inlet temperature rises rapidly for a given engine thrust level so as to reduce CO and HC exhaust emissions.

In the preferred embodiment, a conduit is provided to transfer hot air from a source such as the compressor discharge, combustor discharge or turbine discharge upstream to the compressor inlet, for example. A valve within the conduit, and operated by means of a signal from the engine fuel control system or power lever, is provided to control the rate of recirculation of the heated air. Alternatively, it may be possible to dispense with such a control valve by finding a combination of hot air sources and re-entry locations which would permit the bleed air to flow at low power settings and not at high power settings. In such event, a simple check valve would preclude reverse circulation.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 represents a schematic, partial cross-sectional view of a gas turbine engine incorporating the subject invention;

FIG. 2 is an enlarged cross-sectional view of a portion of the gas turbine engine of FIG. 1;

FIG. 3 is a gas turbofan engine partial cross-sectional schematic, similar to FIG. 1, depicting an alternative embodiment of the present invention; and FIG. 4 is an enlarged cross-sectional view similar to FIG. 2 depicting an alternative embodiment of a portion of the present invention.

DESCRIPTION OF THE PREFERRED EMBODIMENT

Referring to the drawings wherein like numerals correspond to like elements throughout, reference is first directed to FIG. 1 wherein an engine depicted generally at 10 and embodying the present invention is diagrammatically shown. This engine may be considered as comprising generally a core engine 12, a fan assembly 14 including a stage of fan blades 16, and a fan turbine 18 which is interconnected to the fan assembly 14 by shaft 20. The core engine 12 includes an axial flow compressor 22 having a rotor 24. Air enters inlet 26 and is initially compressed by fan assembly 14. A first portion of this compressed air enters the fan bypass duct 28 defined, in part, by core engine 12 and the circumscribing fan nacelle 30 and discharges through a fan nozzle 32. A second portion of the compressed air enters inlet 34, is further compressed by the axial flow compressor 22 and is then discharged to a combustor 36 where fuel is burned to provide high energy combustion gases which drive a turbine 38. The turbine 38, in turn, drives the rotor 24 through a shaft 40 in the usual manner of a gas turbine engine. The hot gasses of combustion then pass to and drive the fan turbine 18, which, in turn, drives the fan assembly 14. A propulsive force is thus obtained by the action of the fan assembly 14 discharging air from the fan bypass duct 28 through the fan nozzle 32 and by the discharge of combustion gases from a core engine nozzle 42 defined, in part, by plug 44. The foregoing description is typical of many present-day gas turbine engines and is not meant to be limiting, as it will become readily apparent from the following description that the present invention is capable of application to any gas turbine engine and is not necessarily restricted to gas turbine engines of the turbofan variety. The foregoing description of the operation of the engine as depicted in FIG. 1 is, therefore, merely meant to be illustrative of one type of application for the present invention.

For most gas turbine engine combustors it has been found that the amount of gas emissions at idle (or below idle) engine operating conditions can be reduced by increasing the temperature of the air entering the combustor. In the present invention, the temperature of the air entering the combustor is increased by recycling the heated air in any of several ways now to be described. Generally, a portion of the air is bled from the engine at a first location and reintroduced back into the engine at a second location subject to two constraints:

(1) the temperature of the air (the motive fluid) passing through the engine must be higher at the bleed source (the first location) than at the re-entry location (the second location); and (2) the re-entry location must be at least as far upstream as the inlet to the combustor.

For example, consider the arrangement of FIG. 1 wherein air is bled from the discharge 45 of compressor 22 and routed by means of conduits 46, 48 to the core compressor inlet 34 where it is reintroduced back into the primary flow stream. Since the temperature at the compressor discharge is greater than that at the inlet by virtue of the work addition through the compressor, the average compressor inlet temperature is increased. When the engine cycle is rebalanced in the known manner to supply a specific idle or subidle thrust, the net result is an increase in combustor inlet temperature of an amount in excess of the increase in inlet temperature. This, in turn, reduces CO and HC emissions significantly.

A simple estimate of the effectiveness of the concept on a commercially available high bypass-ratio gas turbofan engine indicates that a 50° F (27.8° C) increase in core compressor inlet temperature at a 5 percent thrust idle condition will increase the combustor inlet temperature by 75° F (41.7° C). This, in turn, decreases the CO emissions by approximately 28 percent, even after accounting for an increased fuel flow of about 4 percent required to rebalance the cycle. The magnitude of the compressor discharge bleed required to raise the compressor inlet temperature by 50° F is about 14 percent of the total air passing through the core compressor. It is to be noted that these estimates do not include the effect of bleed on the cycle, but just include the inlet temperature effect. The effect of compressor bleed by itself without recirculation is to raise turbine inlet temperature and the combustor fuel-to-air ratio required to supply a given level of idle thrust. This will further contribute to reduced emissions and the two effects will complement each other. Thus, the improvement in idle emissions achieved by raising the compressor inlet temperature is in addition to the effect of compressor discharge bleed.

In principle, the magnitude of the increases in compressor inlet and discharge temperatures can be made any reasonable value depending on the particular engine involved, the power setting in consideration, and practical considerations such as maximum temperature limits of the compressor inlet, the size of the ducting required, and the means necessary for extracting the bleed air and reintroducing it into the compressor inlet.

The obvious choice for the bleed extraction location in contemplation of modifying existing engines is at the compression discharge location (45 of FIG. 1) as discussed hereinabove, by utilizing extraction ports already in the engine for customer purposes such as aircraft cabin pressurization or anti-icing. However, several other sources may be tapped for the hot air depending upon the amount of flow and temperature rise desired. Means for bleeding this hot air are indicated by the dotted lines feeding conduit 48 in FIG. 1. Specifically, they include compressor interstage bleed 50, combustor inlet bleed 52, combustor discharge bleed 54, turbine interstage bleed 56 and turbine discharge bleed 58. Clearly, extraction from the turbine area where the air is at a much higher temperature will provide a much greater increase in compressor inlet and exhaust temperature for a given bleed flow rate. For example, if combustor discharge bleed air at a temperature of 800° F (426.7° C) were used in the previous example, the amount of bleed air required to increase the compressor inlet temperature by 50° F (27.8° C) would be only approximately 4.5 percent of the total air available passing through the engine. Note also that the cycle rematching effect will be different for each extraction location.

FIG. 1 depicts the obvious choice for the re-entry location, at the core compressor inlet 34. While the concept is depicted only schematically in FIG. 1, the geometry of the reintroducing means may vary depending upon individual engine differences and design preferences. For example, FIG. 2 shows one possible arrangement wherein the bleed air is ducted into the flow splitter 60 separating the core inlet duct 34 from the fan bypass duct 28. Therein, the bleed air is fed into a plenum 62 within the splitter and ejected therefrom through means such as representative apertures 64 to mix with the incoming air of inlet 34. Alternatively, as is best shown in FIG. 4, the hot bleed air could be routed from the bleed location to the interior 65 of one of a plurality of hollow frame struts 66 (which typically support the splitter 60 in its proper spacial relationship with the core engine 12) by means of a conduit 67 and ejected therefrom through a plurality of apertures 69. In any event, the design should provide for the suitable mixing of the gases with the primary core engine stream and such mixing should occur early in the compression process.

Means such as valve 68 is provided in conduit 48 to permit the hot bleed air to be reintroduced into the compressor inlet airstream only at the abnormally low power settings discussed hereinabove. Typically, it is anticipated that such a valve would be controlled through the main engine fuel control means 70 which, in turn, is controlled by the pilot through throttle quadrant 72. The particular type of valve and its method of control are well within the capability of engine designers and the details need not be elaborated herein. One example which may be adapted to the present invention is the torque and power sensing and control system taught in U.S. Pat. No. 3,106,062 which is assigned to the assignee of the present invention and the subject matter of which is incorporated herein by reference.

In some cases it may be possible to dispense with valve 68 by finding a hot air source which is at a higher pressure than the re-entry point at low power settings, and at a low pressure at high power settings. Such an arrangement is depicted in FIG. 3 where bleed air is extracted downstream of the turbine at 73 and reintroduced in the early compressor stages at 74. Such an arrangement is possible since the pressure level in the early compressor stages is subatmospheric at low power settings, and any bleed flow would naturally occur from right to left at FIG. 3, whereas the flow would reverse itself and flow rearward (left to right) at higher power settings. This undesirable rearward flow may be prevented by means such as a simple check valve 76, if desired.

Therefore, a method has been provided for reducing CO and HC emissions in a gas turbine engine by bleeding a portion of the motive fluid (for example, air) from a first location and reintroducing it back into the engine motive stream at a second location as long as the bleed air is at a higher temperature than the motive stream at the re-entry location, and as long as the re-entry location is at least as far upstream as the combustor inlet.

It will become obvious to one skilled in the art that certain changes and variations can be made to the above-described invention without departing from the broad inventive concepts thereof. For example, while the routing of bleed flow has been depicted only schematically in FIGS. 1 - 3, it will be recognized that such piping and ducting may be either internal or external to the engine while still being within the scope of the present invention. Furthermore, the present invention is applicable to other types of gas turbine engines including, but not limited to, those of the turbojet and boosted turbofan varieties. It is intended that the appended claims cover these and all other variations in the present invention's broader inventive concepts.

Having thus described the invention, what is claimed as novel and desired to be secured by Letters Patent of the United States is:

1. In a gas turbine engine having a compressor for pressurizing a motive fluid stream, a combustor downstream of said compressor and a turbine drivingly connected to said compressor, the improvement comprising:
    means for bleeding a portion of the motive fluid from a first engine location at a relatively high temperature;
    means for reintroducing the portion at substantially the same high temperature back into the engine motive fluid stream at a second location upstream of the combustor wherein it is mixed with motive fluid at a relatively lower temperature with respect to the bleed portion;
    valve means in serial flow relationship between the bleed meeans and the reintroducing means; and
    control means responsive to engine power setting for positioning said valve means to limit the bleed flow to low engine power operation.

2. In a gas turbine engine having a compressor for pressurizing a motive fluid stream, a combustor downstream of said compressor and a turbine drivingly connected to said compressor, the improvement comprising:
    means for bleeding a portion of the motive fluid from a first engine location at a relatively high temperature;
    means for reintroducing the portion at substantially the same high temperature back into the engine motive fluid stream at a second location upstream of the combustor wherein it is mixed with motive fluid at a relatively lower temperature with respect to the bleed portion; and
    check valve means in serial flow relationship between the bleed means and the reintroducing means; and wherein the first engine location is at a higher pressure than the second location at low engine power operation, and at a lower pressure than the second location at higher engine power operation.

3. The engine as recited in claim 2 wherein said compressor is a multistage compressor and said second location is in the early compressor stages.

* * * * *